United States Patent
Aral (10) Patent No.: US 8,112,201 B2
(45) Date of Patent: Feb. 7, 2012

(54) AUTOMATIC CONTROL OF PASSIVE, TOWED IMPLEMENTS

(75) Inventor: Gurcan Aral, Cupertino, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 646 days.

(21) Appl. No.: 12/244,198

(22) Filed: Oct. 2, 2008

(65) Prior Publication Data

US 2010/0084147 A1 Apr. 8, 2010

(51) Int. Cl.
*G06G 7/66* (2006.01)
(52) U.S. Cl. .......................................... 701/50
(58) Field of Classification Search ................ 701/50, 701/54, 214
See application file for complete search history.

(56) References Cited

U.S. PATENT DOCUMENTS

| | | | |
|---|---|---|---|
| 3,141,982 A * | 7/1964 | Smith | 307/149 |
| 5,717,593 A | 2/1998 | Gvili | |
| 5,928,309 A | 7/1999 | Korver et al. | |
| 5,987,383 A * | 11/1999 | Keller et al. | 701/213 |
| 6,789,014 B1 * | 9/2004 | Rekow et al. | 701/214 |
| 6,804,587 B1 * | 10/2004 | O Connor et al. | 701/26 |
| 7,054,731 B1 | 5/2006 | Lange et al. | |
| 7,065,440 B2 * | 6/2006 | Aral | 701/50 |
| 7,142,956 B2 * | 11/2006 | Heiniger et al. | 701/23 |
| 7,188,015 B2 | 3/2007 | Lange et al. | |
| 7,225,891 B2 * | 6/2007 | Gehring et al. | 180/14.2 |
| 7,263,422 B2 | 8/2007 | Lange | |
| 7,373,231 B2 * | 5/2008 | McClure et al. | 701/50 |
| 7,383,114 B1 * | 6/2008 | Lange et al. | 701/50 |
| 7,437,230 B2 * | 10/2008 | McClure et al. | 701/50 |
| 7,689,354 B2 * | 3/2010 | Heiniger et al. | 701/213 |
| 7,835,832 B2 * | 11/2010 | Macdonald et al. | 701/24 |
| 7,860,628 B2 * | 12/2010 | Lange | 701/50 |
| 7,885,745 B2 * | 2/2011 | McClure et al. | 701/50 |
| 2006/0282205 A1 * | 12/2006 | Lange | 701/50 |
| 2008/0086249 A1 * | 4/2008 | Lange | 701/41 |

* cited by examiner

*Primary Examiner* — Mary Cheung
*Assistant Examiner* — Truc M Do
(74) *Attorney, Agent, or Firm* — NUPAT, LLC; Morrison Ulman (57) ABSTRACT

An automatic control system for passive, towed implements is described. The system provides a strategy for optimal control of a towed implement using a nudge input to an autopilot-controlled tractor. Implement path-tracking error, as measured by a GNSS receiver, is consistently corrected to zero.

24 Claims, 8 Drawing Sheets

AUTOMATIC CONTROL OF PASSIVE, TOWED IMPLEMENTS

TECHNICAL FIELD

The disclosure is related to the control of passive, towed implements for applications such as precision farming.

BACKGROUND

Farmers in the United States operate over 2 million farms covering roughly one billion acres of land and producing hundreds of billions of dollars of crops each year. The farmers spend tens of billions of dollars per year on seeds, fertilizer, chemicals and fuel. A modern farm is a complex operation where precision and efficiency can have a significant impact on the bottom line. According to the USDA, the most efficient 25% of US corn growers spend about $1 to grow a bushel of corn while growers in the least efficient 25% spend $3 to grow the same amount.

One way farmers improve efficiency is by avoiding unnecessary overlaps in tilling, spraying and harvesting operations. In other words, they avoid driving their tractors and equipment over the same area twice. Consider an 80-acre field and a 44-foot wide sprayer towed behind a tractor as an example. The sprayer is towed across the field in series of overlapping tracks. If the overlap between adjacent sprayer tracks is reduced from two feet to four inches four acres of spraying are eliminated. Such precision may be achieved by guiding tractors with global positioning system (GPS) based steering systems.

Precision control of passive, towed farm implements such as plows, rippers, disks, planters, applicators, drills and other equipment has other benefits as well. It makes it easier to operate machinery in dark or dusty conditions. Operators can drive faster and reduce driving stress. The quantity of fuel and chemicals used can be decreased, thereby saving money and the environment. Soil compaction can be avoided by keeping heavy equipment on precise tracks.

Advances in GPS technology (and systems based on other global navigational satellite systems (GNSS) such as the Russian GLONASS and the European GALILEO) have made it possible to drive large farm tractors along predetermined paths very accurately. A tractor can return to a field a year after first working it and follow the same track within an inch. The accuracy of a passive, towed implement is not as good, however.

A passive, towed implement does not have its own steering actuators. It is attached to a tractor by a hitch and the tractor pulls it across the ground. The implement may wander off its intended path for any number of reasons including asymmetrical loading (e.g. tougher ground to plow on one side than the other) or drag due to operating on a slope. Skilled tractor operators can compensate for a wandering implement by deliberately steering the tractor away from a desired path so that the implement stays on the path even though the tractor does not. However, despite the best efforts of operators, this manual method is imprecise, takes a long time and travel distance, and causes operator fatigue. It would be better if this "steering away" technique were automated and made more precise.

Modern tractors are often equipped with GPS (or, more generally, GNSS) based autopilot systems. These systems are capable of driving a tractor along a desired path with high accuracy. Further, it is common for such systems to accept offset commands. For example, one may command the system to drive the tractor a specific number of inches left or right of the programmed path. The tractor then travels parallel to, but offset from, the programmed path. Such lateral offsets are called "nudges".

A wide variety of tractor and autopilot systems are available from different manufacturers. Each of these uses its own control strategy and implementation. However, the competitiveness of the market ensures that the great majority of tractor—autopilot combinations offer path tracking accuracy and response to nudge commands that fall within easily quantifiable parameters.

What is needed is a control system that ensures that passive, towed implements follow their intended path and correct deviations from the path as quickly as possible. The system should operate in concert with an autopilot-controlled tractor without requiring detailed information about the autopilot or the tractor. In fact, the system should interact with the tractor's autopilot only through a nudge control input. Such a system would automate the tiring, tedious task of steering a tractor intentionally off path so as to keep an implement on path and improve the accuracy of the actual path followed by the implement.

BRIEF DESCRIPTION OF THE DRAWINGS

The drawings are heuristic for clarity.

DETAILED DESCRIPTION

A control system for passive implements is now described. The system forces a passive, towed implement onto a desired path by directing an autopilot-controlled tractor optimally off the path. The system decreases the response time required for an implement to execute a nudge offset from a predetermined path.

Figure 1:
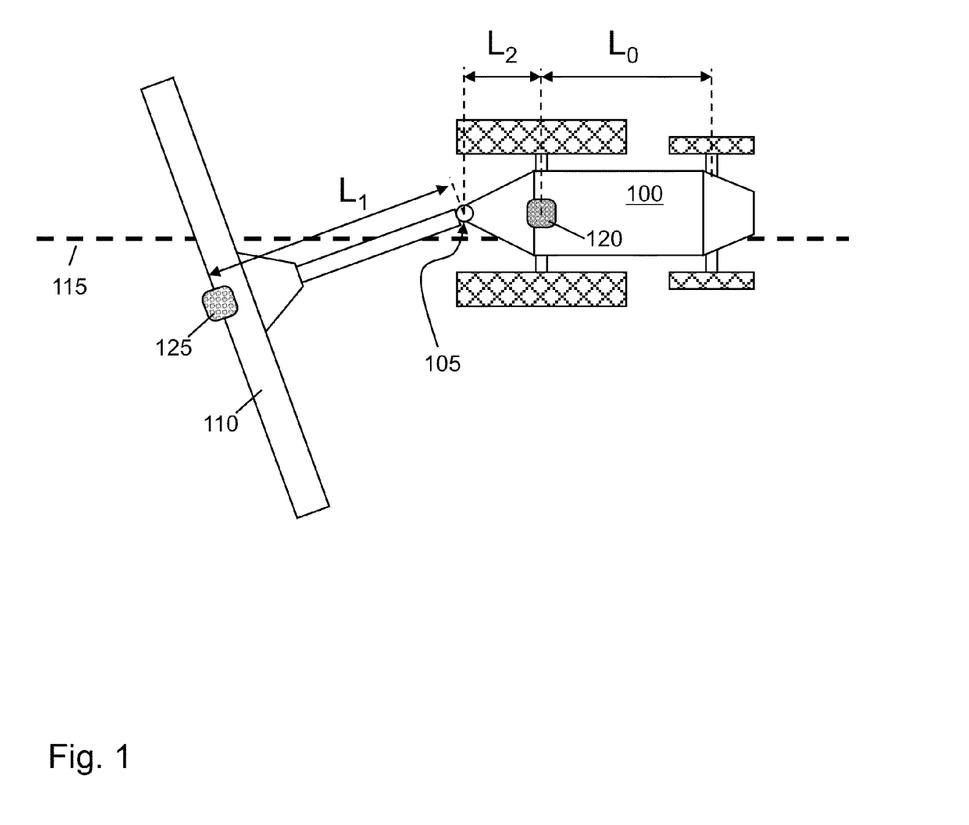
FIG. 1 illustrates a tractor with a hitch towing a passive implement along a desired path.

FIG. 1 illustrates a tractor with a hitch towing a passive implement along a desired path. Tractor 100 includes hitch point 105 to which passive, towed implement 110 is attached. Dashed line 115 indicates the desired path along which the tractor and implement are to move. Note that in FIG. 1 neither the tractor nor the implement are on the desired path; rather they are maneuvering in an attempt to return to the path. The position of tractor 100, as represented by a reference point at the midpoint of the tractor's rear axle, is measured by a GNSS receiver connected to antenna 120. Similarly, the position of passive, towed implement 110 is measured by a GNSS receiver connected to antenna 125 which is located at a reference point on the implement $L_1$ away from the hitch point. The tractor's wheelbase is $L_0$ and the distance from its rear axle to the hitch point is $L_2$.

The GNSS receivers used to measure the position of the tractor and the implement may take advantage of corrections such as those provided by satellite or ground based augmentation systems (SBAS or GBAS). Examples of SBAS include the Federal Aviation Administration's Wide Area Augmentation System (FAA WAAS), the European Geostationary Navigation Overlay Service (EGNOS) operated by the European Space Agency, the Multi-functional Satellite. Augmentation System (MSAS) operated by Japan's Ministry of Land, Infrastructure and Transport, and various proprietary systems operated by commercial enterprises. Examples of GBAS include the United States' Local Area Augmentation System (LAAS) and various European differential GPS networks. Even greater accuracy can be achieved by measuring GNSS carrier phase using so-called real time kinematic (RTK) techniques involving a nearby base station located at a surveyed position. RTK allows centimeter-level positioning, for example.

Figure 2:
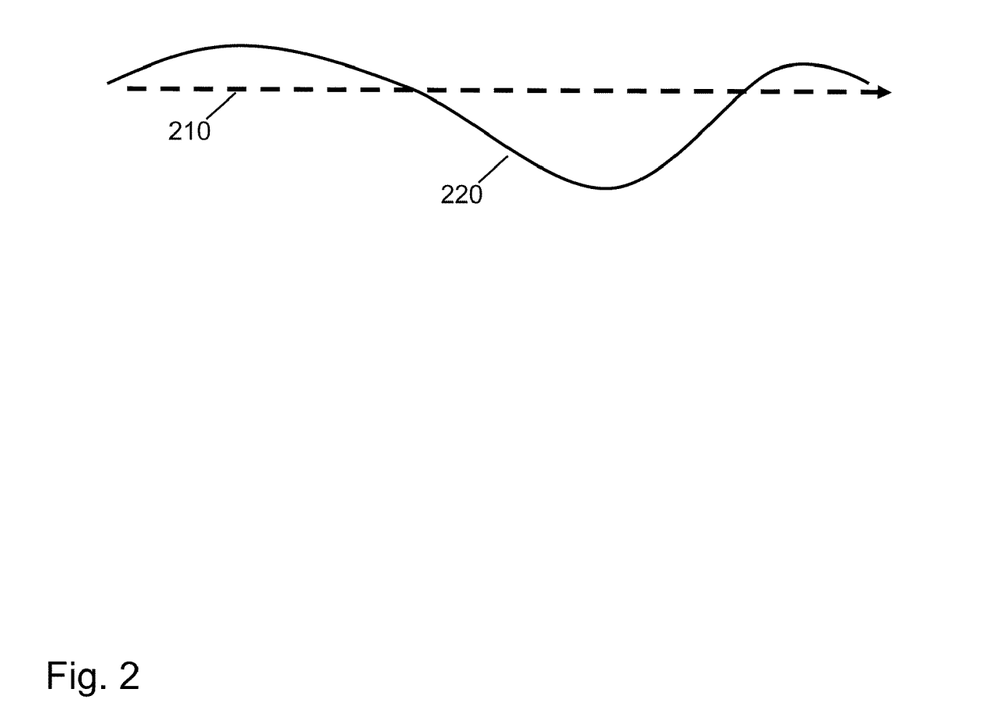
FIG. 2 shows the path of a passive, towed implement wandering away from a desired path.

FIG. 2 shows the path of a passive, towed implement wandering away from a desired path. In FIG. 2, dashed line 210 represents a desired path for a passive implement to follow while solid line 220 represents a possible actual path of an implement. Path 220 wanders off course from desired path 210 for any of a number of reasons including uneven load on the implement, sloping ground, or random disturbances. One of the tasks of control system described herein is to minimize implement deviations from a desired path by speeding up the response of an implement to nudge commands.

Figure 3:
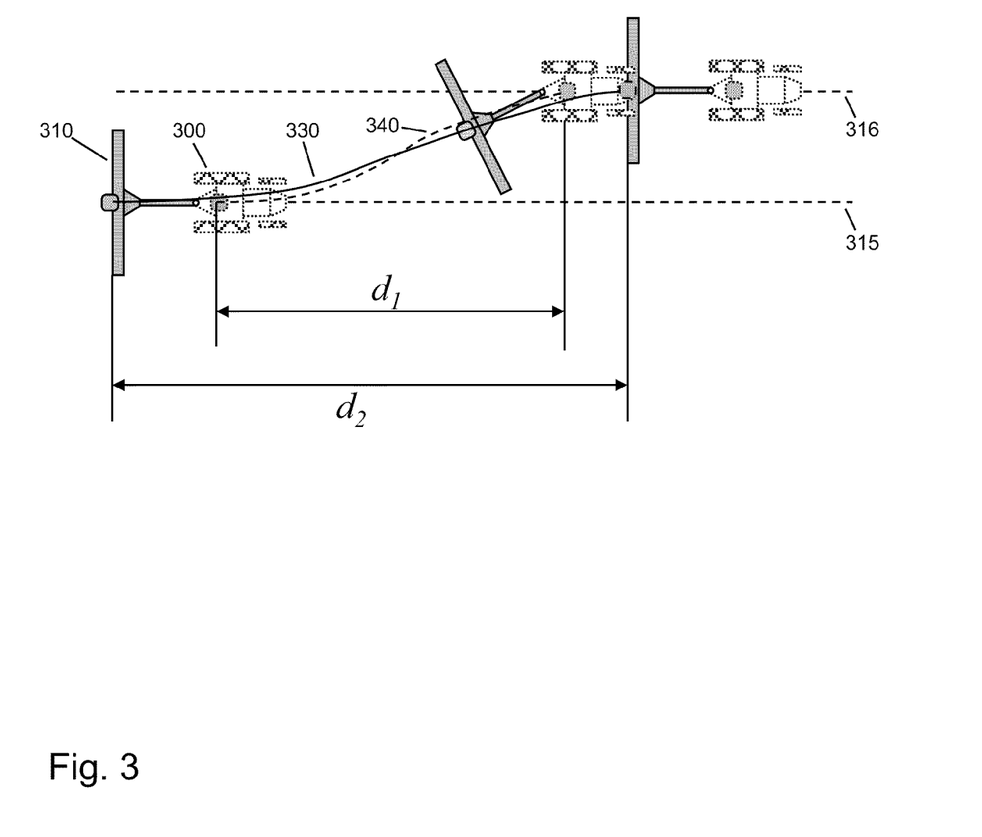
FIG. 3 shows the paths of a conventionally controlled tractor and a passive, towed implement in response to a nudge offset command.

FIG. 3 shows the paths of a conventionally controlled tractor and a passive, towed implement in response to a nudge offset command. In the figure, tractor 300 initially pulls passive implement 310 along desired path 315. In response to a nudge command, the tractor moves to offset path 316 and the implement follows behind. The path followed by the tractor when moving from path 315 to 316 is shown by dashed line 340. Solid line 330 shows the path of the towed implement. The tractor completes the nudge to the offset path in a distance $d_1$ as shown in the figure. The implement takes a distance, $d_2$, to complete the change to the new path. This slow implement response may be insufficient to prevent the implement from wandering off course during path tracking or offsetting to a new path.

Figure 4:
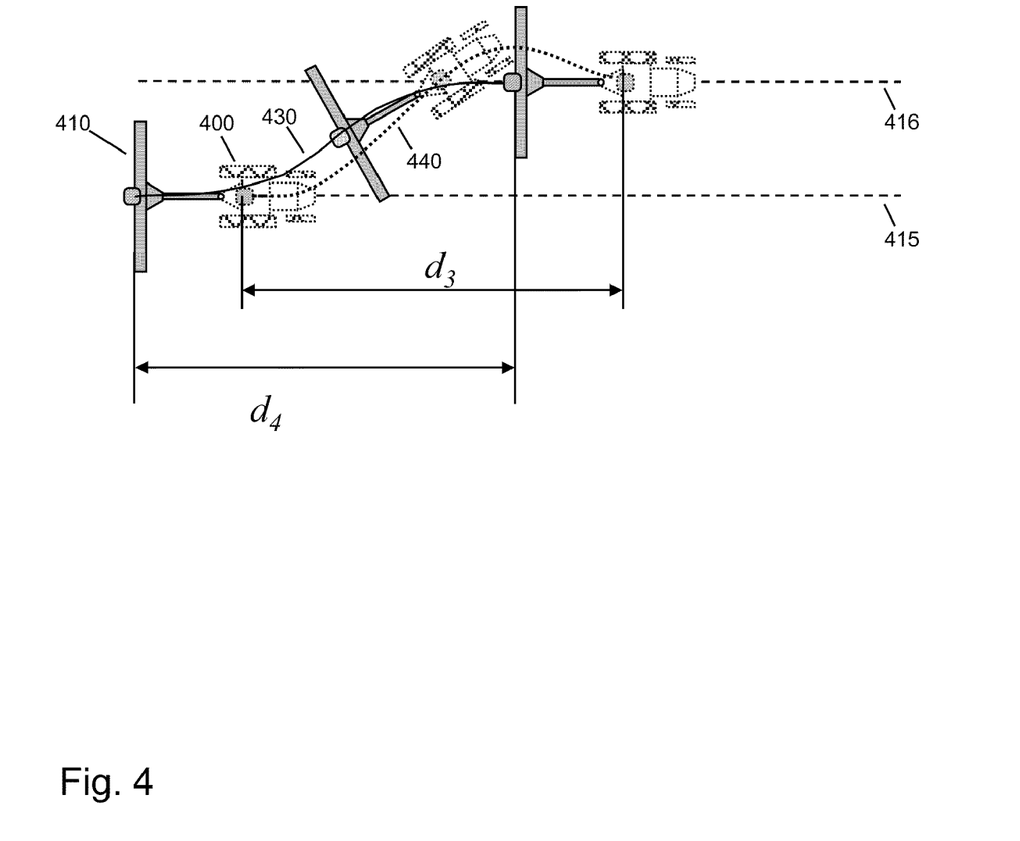
FIG. 4 shows the paths of a tractor and a passive, towed implement in response to a nudge offset command when the implement is controlled by an advanced control system.

To make the implement respond faster one may over steer the tractor. FIG. 4 shows the paths of a tractor and a passive, towed implement in response to a nudge offset command when the implement is controlled by an advanced control system. In the figure, tractor 400 initially pulls passive implement 410 along desired path 415. In response to a nudge command, the tractor moves to offset path 416 and the implement follows behind. The path followed by the tractor when moving from path 415 to 416 is shown by dashed line 440. Solid line 430 shows the path of the towed implement. The tractor completes the nudge to the offset path in a distance $d_3$ as shown in the figure. The implement completes the nudge in a distance $d_4$ which is less than $d_2$ of FIG. 3. Thus, when the tractor with an advanced control system is given a nudge command, the response of the implement is improved. The path 440 followed by the tractor initially overshoots the final desired path. The effect of this maneuver is that the settling distance, $d_4$, of the implement is reduced. (Note that in FIGS. 3 and 4 reverse reaction of the implement at the beginning of an offset maneuver has not been illustrated. See FIG. 5B.)

It is possible to design a conventional control system that accomplishes the result shown in FIG. 4. Detailed knowledge of the design of the tractor autopilot along with a model for the implement may be used to design an observer, for example a Kalman filter. The filter is a continually corrected model of the tractor—hitch—implement system which is used to estimate inaccessible internal variables such as the position, speed and heading of the tractor. The estimated variables may then be used as input to a feedback controller according to state feedback design. This conventional approach requires knowledge of the tractor autopilot. Even with such knowledge, however, this approach may be economically infeasible as the autopilot for each type of tractor must be modified for each towed implement.

The advanced control system described herein does not depend on detailed knowledge of the tractor autopilot. Instead it relies on the reasonable assumption that the tractor's autopilot is adequate and does not need to be modified. The advanced control system allows a nudge command to control implement position directly without modifying the dynamics of the tractor controller.

It is useful at this point to briefly review the tractor—hitch—implement system of FIG. 1. The implement is characterized by the distance, $L_1$, from the hitch point to the position of the GNSS antenna on the implement. The location of the antenna on the implement is the point that is controlled; i.e. the point that is made to follow a desired implement path. The hitch is characterized by the distance, $L_2$, from the hitch point to the position of the GNSS antenna over the midpoint of the tractor's rear axle. The tractor is characterized by its wheelbase, $L_0$.

The advanced control system described herein assumes that the tractor has an autopilot whose response can be approximately modeled by a simple system. Competitive tractor—autopilot systems meet this requirement. As an example, consider a critically damped second order system. In this case, the tractor dynamics can be approximated by:

$$\ddot{x} + 2\zeta\omega\dot{x} + \omega^2(x - \Delta x) = 0$$

where x is the actual offset from a path and $\Delta x$ is the requested offset from the path; i.e. a nudge. $\zeta$ is a damping factor which equals one for a critically damped system. $\omega$ is the angular frequency of the system and may be determined from step response of the tractor—autopilot system to a small nudge.

Figure 5:
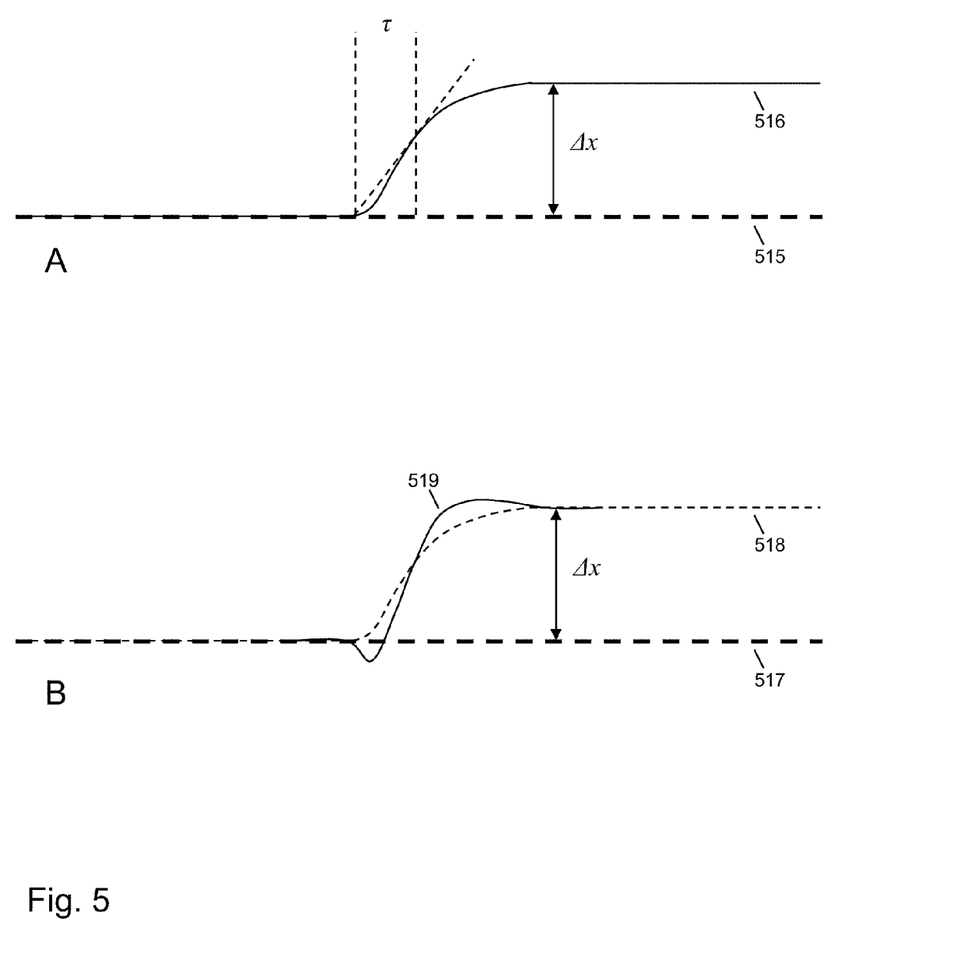
FIG. 5A shows the path of a tractor in response to a nudge command.
FIG. 5B shows the paths of a tractor and its hitch point in response to a nudge command.

FIG. 5A shows the path of a tractor in response to a nudge command. The nudge has directed the tractor to offset its motion from predetermined path 515 by a small distance $\Delta x$. The path followed by the tractor in response to the nudge is depicted by line 516. The characteristic time required for the tractor to respond to the commanded nudge is $$\tau \sim \frac{2\pi}{\omega}.$$

The advanced control system described herein does not require any knowledge of the tractor's autopilot dynamics other than an approximate value for $\tau$. For a typical tractor—autopilot system $\tau \approx 1\sim 2$ sec.

FIG. 5B shows the paths of a tractor and its hitch point in response to a nudge command. The nudge has directed the tractor to offset its motion from predetermined path 517 by a small distance $\Delta x$. The path followed by the tractor in response to the nudge is depicted by dashed line 518. Solid line 519 shows the path followed by the tractor hitch point during execution of the nudge. The hitch point is located a distance, $L_2$, behind the midpoint of the tractor's rear axle. When the tractor changes heading to move to a new offset, the hitch point initially moves in the opposite direction. This reverse reaction may be modeled by closed form geometric relationships. For example the offset of the hitch point from a desired path is related to the offset of the tractor by: $x_h = x_t - L_2 \sin \psi$, where $x_h$ is the hitch point offset, $x_t$ is the tractor offset, and $\psi$ is the tractor heading.

Given an approximation for the tractor's dynamics, and having characterized the geometrical parameters of the tractor, hitch and implement, one may design a feedback control model for steering the tractor. Many such models are possible; an example is given here. Tractor motion for small deviations from a desired path is described by:

$$\dot{\psi} = \frac{V}{L}\theta$$
$$\dot{x} = V\psi$$

where V and L are the tractor's speed and wheelbase respectively and $\psi$ is the tractor's heading. $\theta$ is the tractor's steering angle; i.e. the angle of the front wheels away from straight ahead. x is the lateral offset from the desired path.

Figure 6:
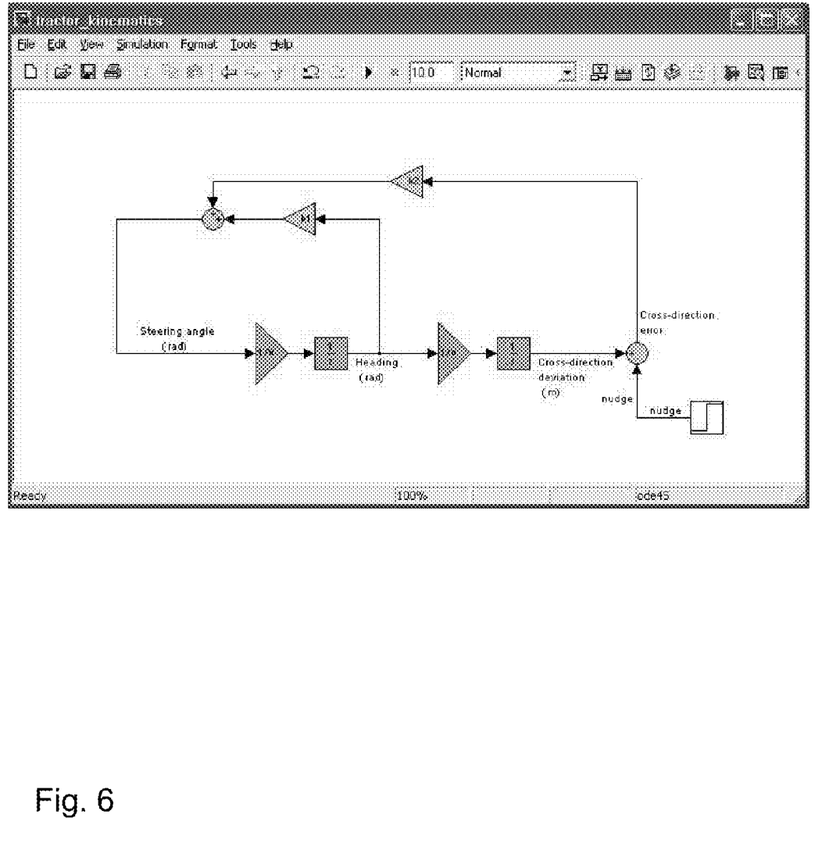
FIG. 6 shows a Simulink® model of a typical tractor control system.

FIG. 6 shows a Simulink® model of a typical tractor feedback control system based on the equations above. In the model, feedback gains k1 and k2 are summed to influence the steering angle required to minimize cross-direction error. (Cross-direction is another term for offset.) k1=2(k2) in a critically damped system. A nudge may be introduced to provide a step change in the cross-direction error. When this happens, the feedback control system changes the tractor's steering angle to make the tractor execute the nudge as illustrated in FIG. 5A.

An advanced control system for a passive, towed implement is now described in more detail. The system employs an architecture that is analogous to the Smith predictor introduced in 1957 by O. J. M. Smith. A Smith predictor is most often used in scenarios where a process to be controlled is followed by a delay which prevents immediate measurement of a process value of interest. When a process value of interest is measured after a delay, any actuation to affect the dynamic behavior of the process arrives too late to be used effectively. The Smith predictor circumvents this problem by driving a model of the process and a model of the delay with the same actuation value as applied to the actual process. If the models are reasonably accurate, the Smith predictor provides estimated values of otherwise inaccessible immediate process values. It also provides an estimated value of the delayed measurement. The estimated immediate process values are used to modify the dynamic behavior of the process (for example to achieve a faster response) and the estimated delayed process value is compared to the actual delayed measurement. The difference detected in this comparison is used to compensate for process disturbances.

Although the Smith predictor is most often thought of in terms of a process followed by a delay, in fact some other dynamic process may be substituted for the delay. In the classic delay scenario, the Smith predictor allows a control system to operate on a process of interest while leaving the delay undisturbed. Here, the Smith predictor is used to control a passive, towed implement while leaving a tractor autopilot system undisturbed.

Figure 7:
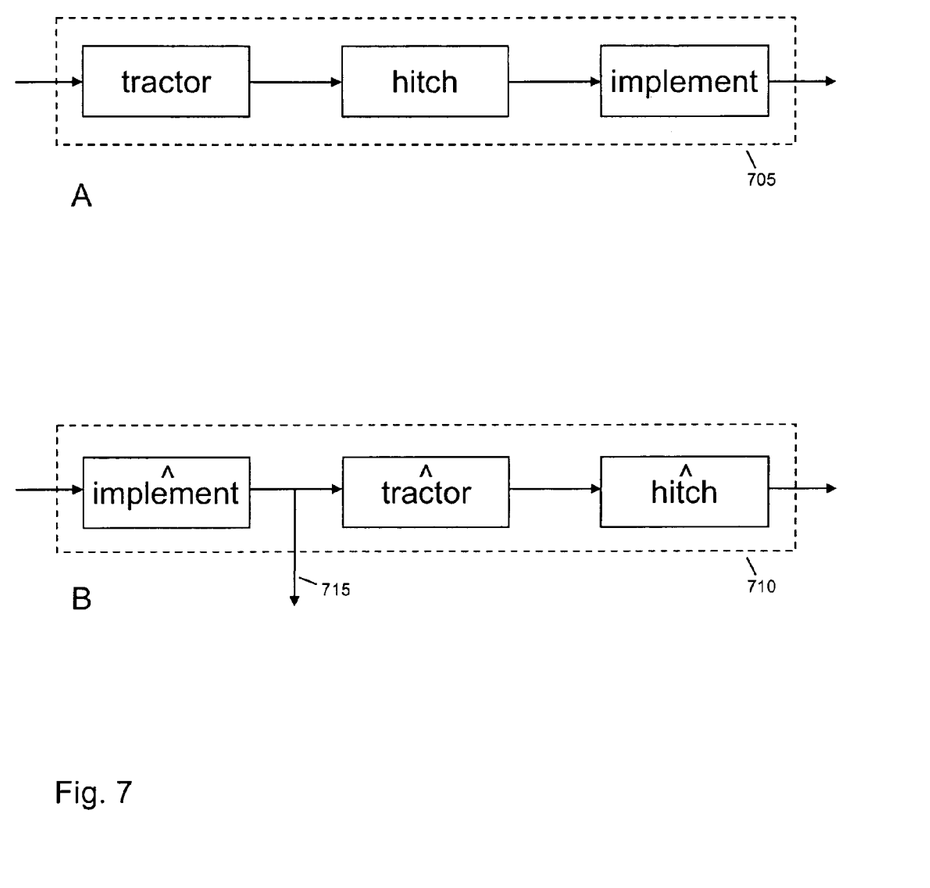
FIG. 7A shows a conventional model for a tractor—hitch—implement system.
FIG. 7B shows a model for a fictitious tractor—hitch—implement system in which the order of subsystems has been changed compared to the real world system.

FIG. 7A shows a conventional model for a tractor—hitch—implement system. Input to the system is made by sending nudge commands to the tractor autopilot (labeled "tractor" in the figure). The output from the system is the position of the implement as measured by its GNSS receiver. In order to control the implement using the conventional model of FIG. 7A, detailed knowledge of the tractor autopilot is required. However, the values of internal process variables, i.e. those inside dashed box 705, are not known. They depend on details of the tractor autopilot which are proprietary to its manufacturer.

The model of FIG. 7A is a single-input-single-output linear system. Therefore its internal elements may be rearranged without affecting its input—output behavior. Such a rearrangement is shown in FIG. 7B. FIG. 7B shows a model for a fictitious tractor—hitch—implement system in which the order of elements has been changed compared to the real world system. In FIG. 7B a model of the implement precedes models of the tractor and the hitch. (The tractor and hitch elements could also be reordered.)

Keeping in mind the Smith predictor, one may view the model of FIG. 7B as including a process to be controlled—the implement—and a process to leave undisturbed—the tractor and hitch. In FIG. 7B, however, values of internal process variables (i.e. inside dashed box 710) are estimated by the implement, tractor and hitch models. In particular, estimates of implement error are available at intermediate output 715.

Figure 8:
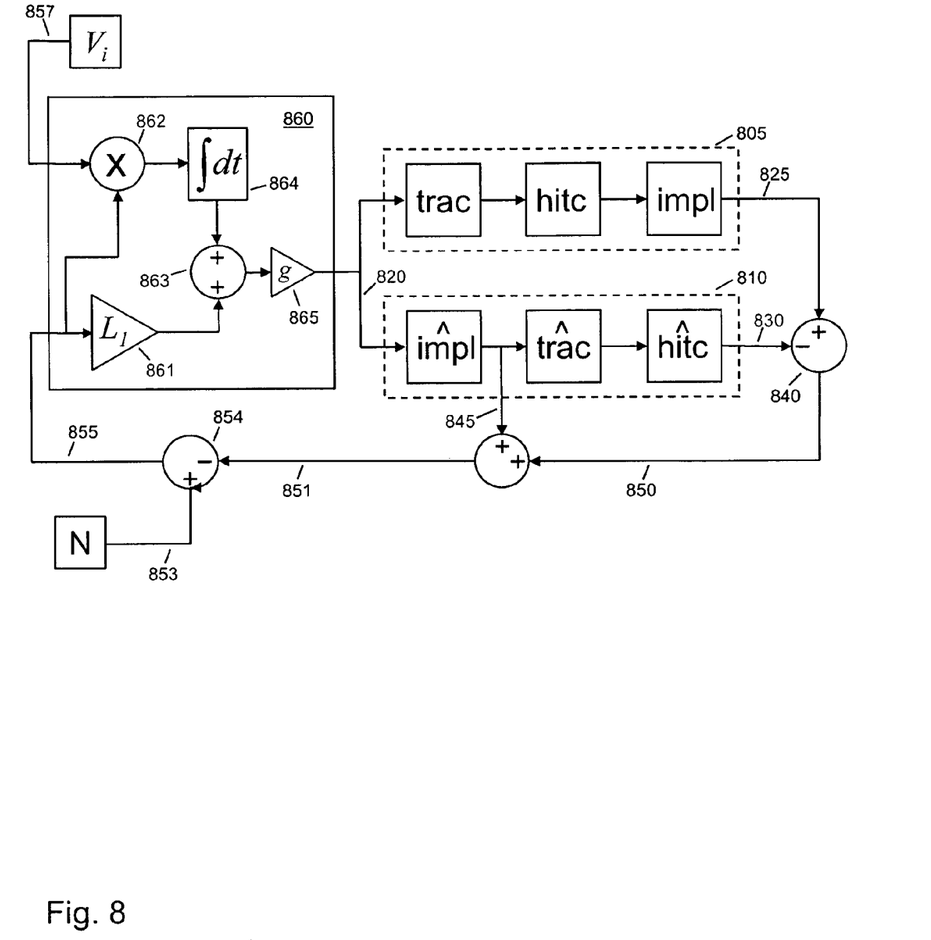
FIG. 8 shows an advanced control system for a passive, towed implement using a control strategy analogous to a Smith predictor.

FIG. 8 shows an advanced control system for a passive, towed implement using a control strategy analogous to a Smith predictor. In FIG. 8, control module 860 sends a nudge command signal to an actual tractor—hitch—implement system 805 (i.e. an autopilot-controlled tractor towing a passive implement attached to the tractor hitch) and to an implement—tractor—hitch model 810. The output 825 of the actual system is the offset of the implement as measured by the implement's GNSS receiver. The output 830 of the model system is an estimate of the offset of the implement. The difference between outputs 825 and 830 is determined by comparator 840 and its output 850 is summed with the estimated immediate implement offset 845 from the implement—tractor—hitch model 810. The summed offset 851 is changed in sign and added to an optional operator's implement nudge 853 in comparator 854. (Operator's implement nudge 853 is zero unless the operator decides that he would like to offset the implement from its desired path.) Finally error signal 855 is fed to control module 860. The speed 857 of the implement, $V_i$, is also input to control module 860. Speed 857 may be determined by the GNSS receiver mounted on the implement.

The design of FIG. 8 controls the implement's dynamics, rather than those of the tractor and its hitch, to improve implement path-tracking response. The dynamics of the tractor and its hitch are left undisturbed in analogy to the delay in a classic Smith predictor. The only actual process variables that are measured are the implement position and speed, obtained by GNSS, and the only input to the system is a series of nudge commands 820 to the tractor autopilot.

The design of FIG. 8 comprises two feedback loops: one including signal path 830, the "outer loop", and the other including signal path 845 the "inner loop". The inner loop controls the implement's dynamics directly while the outer loop corrects mismatches between the actual and model tractor—hitch—implement systems. The estimated immediate implement offset 845 is used to modify the dynamic behavior of the implement to achieve a faster implement response and the estimated delayed implement offset 830 is compared to the actual implement offset 825. The difference detected in this comparison is used to compensate for process disturbances and drifts.

Within actual tractor—hitch—implement system 805, "trac", "hitc", and "impl" refer to the tractor, hitch and implement respectively. In this actual system nudge commands 820 from control module 860 are directed to the tractor's autopilot system. Movement of the tractor affects movement of the hitch and movement of the towed implement attached to the hitch. Within implement—tractor—hitch model 810, "$\widehat{impl}$",, "$\widehat{trac}$",, and "$\widehat{hitc}$" refer to mathematical models of the implement, autopilot-controlled tractor and hitch respectively. These models take into account the geometric relationships between the actual tractor, implement and hitch parameterized by lengths $L_0$, $L_1$, and $L_2$ described earlier. The model for the autopilot-controlled tractor assumes that it reacts to a nudge command as a critically damped second order system with time constant τ. This model is adequate for a wide range of commercially available agricultural tractors.

The reordering of elements in the model ("$\widehat{impl}$",→"$\widehat{trac}$",→"$\widehat{hitc}$" versus trac→hitc→impl) means that in model 810 nudge commands are applied directly to the implement and an immediate estimate of implement error is available for feedback to control module 860. However, the overall response of the reordered model elements is the same as it would be if they were arranged in the order of the actual system since the system is linear. The Smith predictor approach allows a generic model to be used for the tractor and hitch with good results without needing to know the internal details of the tractor model as would be required in a conventional feedback controller. Thus the Smith predictor approach allows the implement to be controlled directly.

Within control module 860 error signal 855 is fed to amplifier 861 and multiplier 862. Implement speed 857 is also fed to multiplier 862. The output of the multiplier is fed to discrete-time integrator 864. The outputs of the integrator and of amplifier 861 are summed in adder 863 and fed to amplifier 865. The output of amplifier 865 is nudge signal 820. The gain of amplifier 861 is proportional to the length $L_1$ between the implement hitch point and the implement reference point; i.e. the location of the implement's GNSS receiver. More simply, $L_1$ is the implement boom length. The gain of amplifier 865 is a tuning parameter.

In operation, control module drives error 855 to zero by sending nudge commands to the tractor autopilot within the actual tractor—hitch—implement system 805. Error 855 is composed of immediate implement error 845 (inner loop) and the error (outer loop) or drift between the model 810 of the overall system and the actual system 805. The control module also takes implement speed 857 into account.

The advanced control system described here may be implemented in application-specific digital electronic circuits or as software running in one or more general purpose digital processors. The software executes calculations required to solve the differential equations governing second order, critically damped motion, calculates the geometric relationships between the tractor, implement and hitch, and implements a feedback control system.

In the descriptions above, the desired track has been represented as a straight line; however, the desired track may also contain curves without affecting the design, principles of operation, or efficacy of the control system. In fact, the system improves curve tracking accuracy.

The control system for passive, towed implements described herein corrects implement path-tracking errors to zero consistently and optimally. It permits direct precision control of passive implements rather than the tractors that tow them.

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope of the systems and methods are to be determined entirely by the claims.

What is claimed is:

1. A control system for towing a passive implement along a desired path with an autopilot-controlled tractor comprising:
   a GNSS receiver mounted on the passive implement;
   a control module; and,
   a model comprising implement, tractor and hitch elements ordered within the model so that nudge inputs to the model are applied directly to the input of the implement element and the output of the implement element is fed back to the control module;
   wherein,
   the passive implement is connected to the tractor by a hitch, the GNSS receiver measures position and speed of the passive implement,
   the model estimates immediate passive implement offset and delayed offset of the tractor-hitch-implement system from the desired path,
   the control module sends nudge commands to the autopilot-controlled tractor such that passive implement offset from the desired path is minimized.

2. The control system of claim 1 wherein the tractor element of the model includes the tractor wheelbase and a critically damped, second order system characterized by the time, τ, required for the tractor to respond to a nudge input.

3. The control system of claim 2 wherein τ is between 1 and 2 seconds.

4. The control system of claim 1 wherein the hitch element of the model includes the distance from the hitch to the midpoint of the tractor's rear axle.

5. The control system of claim 1 wherein the implement element of the model includes the distance from the implement's control point to the hitch.

6. The control system of claim 1 wherein the GNSS receiver is a GPS receiver employing SBAS corrections.

7. The control system of claim 6 wherein the SBAS corrections are obtained from the FAA WAAS.

8. The control system of claim 1 wherein the GNSS receiver is a GPS receiver employing RTK positioning.

9. A method for guiding a passive implement along a desired path comprising:
providing an autopilot-controlled tractor having a nudge input;
providing a GNSS receiver fixed to the passive implement;
towing the passive implement behind the tractor via a hitch;
using a model of the tractor—hitch—implement system to provide feedback to a control system that provides nudge inputs to the autopilot-controlled tractor and to the model;
wherein,
the model estimates the immediate passive implement offset from the path;
tractor, hitch and implement elements within the model are arranged such that nudge inputs from the control system are applied to the implement element directly; and,
the control system nudge inputs cause the difference between the actual passive implement path and desired path to be minimized.

10. The method of claim 9 wherein the tractor element of the model includes the tractor wheelbase and a critically damped, second order system characterized by the time, $\tau$, required for the tractor to respond to a nudge input.

11. The method of claim 10 wherein $\tau$ is between 1 and 2 seconds.

12. The method of claim 9 wherein the hitch element of the model includes the distance from the hitch to the midpoint of the tractor's rear axle.

13. The method of claim 9 wherein the implement element of the model includes the distance from the implement's control point to the hitch.

14. The method of claim 9 wherein the GNSS receiver is a GPS receiver employing SBAS corrections.

15. The method of claim 14 wherein the SBAS corrections are obtained from the FAA WAAS.

16. The method of claim 9 wherein the GNSS receiver is a GPS receiver employing RTK positioning.

17. A control system for a passive implement towed by an autopilot-controlled tractor comprising:
an inner feedback loop that uses estimated immediate passive implement offsets from a desired path to modify the dynamic behavior of the implement;
an outer feedback loop that uses the difference between estimated delayed passive implement offsets from the path and actual measured passive implement offsets from the path to compensate for drift and disturbances; and,
a control module that combines measured passive implement speed with error signals generated by the inner and outer loops to generate nudge commands that are fed to the tractor's autopilot such that the passive implement offset from the desired path is minimized.

18. The system of claim 17 wherein the nudge commands are fed to a model of the implement as well as to the tractor autopilot.

19. The system of claim 17 wherein the control module comprises an amplifier that amplifies the combined error signal generated by the inner and outer loops in proportion to the distance between the implement's hitch point and the location of a GNSS receiver mounted on the implement.

20. The system of claim 17 wherein the control module comprises an integrator that integrates the product of the implement's speed as measured by a GNSS receiver and the combined error signal generated by the inner and outer loops.

21. The system of claim 17 wherein the control module comprises proportional and integral elements, the outputs of which are summed to generate the nudge commands.

22. The system of claim 17 further comprising an operator's implement nudge input for offsetting the implement from its desired path by a specified distance.

23. A control system for a passive implement towed by an autopilot-controlled tractor comprising:
a GNSS receiver mounted on the passive implement; and,
a feedback loop incorporating a Smith predictor, wherein, nudge commands are sent to the tractor's autopilot and to a model of a tractor—hitch—implement system,
estimated immediate passive implement offset (from a desired path) obtained from the model is used to speed up the response of the passive implement, and,
estimated delayed passive implement offset obtained from the model is compared to actual passive implement offset to compensate for process disturbances.

24. The control system of claim 23 further comprising a control module that:
a. amplifies an error signal in the feedback loop in proportion to the distance between the implement's hitch point and its GNSS receiver antenna,
b. multiplies the error signal by the speed of the implement and integrates the result over time, and,
c. sums the results of operations (a) and (b) to generate the nudge commands.

* * * * *